United States Patent Office 3,400,078
Patented Sept. 3, 1968

3,400,078
SCALE INHIBITOR COMPOSITION AND METHOD
Loyd W. Jones, Tulsa, Okla., assignor to Pan American Petroleum Corporation, Tulsa, Okla., a corporation of Delaware
No Drawing. Filed Nov. 8, 1965, Ser. No. 506,865
9 Claims. (Cl. 252—180)

ABSTRACT OF THE DISCLOSURE

A liquid inhibitor for sulfate and carbonate scale is made up of water, potassium hydroxide, carboxymethyl cellulose, which has been oxidized in the presence of the potassium hydroxide, and potassium pyrophosphate. A method of preparing the liquid compositions involves oxidizing the carboxymethyl cellulose in the presence of strong potassium hydroxide solution.

---

This invention relates to a scale inhibitor. More particularly it relates to a concentrated liquid product for preventing precipitation of most types of mineral scales deposited from water.

In my U.S. Patent 2,970,959, the use of a combination of carboxymethyl cellulose and certain phosphates to inhibit sulfate and carbonate scale is described. A solid concentrate is described in the patent but several problems have prevented the preparation of a liquid concentrate in spite of considerable demand for such a liquid composition.

There are two principal problems. One is the high viscosities of even dilute carboxymethyl cellulose solutions. For example, one of the lowest viscosity grades available forms an aqueous solution having a viscosity of about 1000 centipoises at 5 percent concentration and about 80° F. At a little over 7 percent concentration the viscosity is 10,000 centipoises at about 80° F. This is barely pourable. A higher concentration is obviously desirable but hardly seems possible. The other problem involves the phosphates. As explained in my U.S. Patent 2,970,959 one of the problems with the metaphosphates and polyphosphates such as sodium tripolyphosphate is that they change to the inactive ortho form after a time in water solution. This would seem to make it impossible to prepare a stable aqueous concentrate containing a scale inhibiting phosphate. In addition, the phosphates in general are characterized by low solubilities. Even sodium tripolyphosphate, for example, is soluble to the extent of only about 12 percent in water at a temperature of about 70° F. Tetrasodium pyrophosphate is soluble to the extent of only about 3 percent at 32° F., a temperature frequently reached in the field or even in warehouses.

With these problems in mind, an object of this invention is to provide a stable aqueous concentrate containing carboxymethyl cellulose and a phosphate active to inhibit carbonate scale deposition. Still other objects will be apparent to those skilled in the art from the following description and claims.

In general, I accomplish the object of my invention by using an alkaline solution of carboxymethyl cellulose treated with an oxidizing agent, the solution also containing a specific phosphate.

My U.S. Patent 3,024,191 discusses the ability of oxidizing agents such as sodium perborate to decrease the viscosities of aqueous solutions of carboxymethyl cellulose. I have now found that these carboxymethyl celluloses, treated with oxidizing agents, retain their scale inhibiting properties if the oxidation is not carried too far. In fact, the products have an improved scale inhibiting ability when prepared according to my invention. Much higher concentrations of carboxymethyl celluloses are involved in my scale inhibitor concentrate than were used in the process described in my U.S. Patent 3,024,191. In order to obtain carboxymethyl cellulose concentrations of around 10 percent, or even more, it is necessary not only to treat the cellulose derivative with an oxidizing agent but to perform this operation in a water solution the pH of which has been greatly increased by the addition of sodium hydroxide or potassium hydroxide, for example. By means of these two expedients, oxidation and increase of pH, a pourable aqueous solution containing up to about 30 percent carboxymethyl cellulose can be prepared.

In order to prepare a stable aqueous liquid concentrate containing a scale inhibiting phosphate, additional strict limitations must be observed. First, the phosphate must be a potassium pyrophosphate. The reason it must be a potassium salt is to obtain the required solubility. The reason it must be a pyrophosphate is that this particular type of phosphate is sufficiently stable in alkaline aqueous solution to permit storage for at least several months. Preferably, the potassium pyrophosphate is tetrapotassium pyrophosphate. The potassium hydrogen pyrophosphates are also satisfactory, however, since they will be converted to the tetrapotassium salt in the alkaline solution.

The second limitation required by the presence of the potassium pyrophosphate is that the hydroxide used in the solution must be potassium hydroxide. The use of sodium hydroxide, for example, causes precipitation of the pyrophosphate as the sodium salt.

The carboxymethyl cellulose may be the sodium salt since the amount of sodium ion from this material is not sufficient to cause precipitation of sodium pyrophosphate. In general, the carboxymethyl cellulose can be any of the those described in my U.S. Patent 2,970,959. The low viscosity forms are preferred because maintaining as low as a viscosity as possible is one of the principal problems is most applications. The sodium salts are generally preferred since they are usually less expensive and more readily available.

Treatment of carboxymethyl cellulose with an oxidizing agent may be accomplished by forming a strong solution of this cellulose derivative in potassium hydroxide and bubbling or stirring air into the solution at a temperature of about 120 to 150° F. for a period of several hours. Many other oxidizing agents such as hydrogen peroxide, potassium permanganate, sodium hypochlorite or the like can be used. Sodium perborate is quick acting and very effective. The preferred agent is potassium persulphate since this is a potassium salt and an unusually small amount is required to perform the required oxidation. The amount of oxidizing agents such as sodium perborate should be between about 15 and about 35 percent by weight of the carboxymethyl cellulose. The amount of potassium persulphate may be as little as 2 or 3 percent by weight of carboxymethyl cellulose. In general, the amount of any oxidizing agent which is selected should be sufficient to treat the carboxymethyl cellulose to a degree sufficient to provide a pourable solution. As noted above, the actual minimum amount required depends upon the agent used.

The maximum amount of oxidizing agent also varies widely depending upon the specific chemical used. The minimum and maximum can be easily determined for any particular agent by preparing solutions containing about 7 to 8 percent potassium hydroxide and various amounts of oxidizing agents. The solutions are heated to about 130 to 140° F. Carboxymethyl cellulose is then slowly sifted into the solutions while stirring. Enough of the cellulose derivative is added to provide a 15 percent solution. The solution should be stirred at 130 to 140° F. for at least about an hour. If too little oxidizing agent is present, the resulting solution will not be pourable. If too much oxidizing agent is present, the solution will be very dark brown or even black due, apparently, to extensive charring of the carboxymethyl cellulose by the oxidizing agent. The solution will also be very non-viscous due to excessive alteration of the carboxymethyl cellulose.

The stronger oxidizing agents will react with the carboxymethyl cellulose even at temperatures of 70 to 80° F. Many hours are required for the reaction to proceed to the desired degree, however. In order to obtain reaction at a reasonable rate, a temperature of about 120 to 150° F. is desirable. Somewhat higher temperatures can be used with most concentrations of weak oxidizing agents. With strong oxidizing agents near their maximum concentrations, however, the temperature should no exceed about 150° F. to avoid serious charring and decomposition of the carboxymethyl cellulose. In general, the oxidizing temperature, like the oxidizing agent concentration, should be sufficient to cause the solution to become pourable but insufficient to cause charring and excessive decomposition of the carboxymethyl cellulose. Preferably, the temperature should be in the range from about 120 to about 150° F.

My invention will be better understood from a description of the manufacture of a 200 gallon batch of the composition for field testing. The composition was as shown in Table I.

TABLE I

| Component | Weight, lb. | Percent by wt. |
|---|---|---|
| KOH | 104.0 | 5.00 |
| K$_4$P$_2$O$_7$ | 389.5 | 18.72 |
| Carboxymethyl cellulose | 228.8 | 11.00 |
| K$_2$S$_2$O$_8$ | 5.7 | 0.28 |
| Water | 1,352.0 | 65.00 |
| | 2,080.0 | 100.00 |

The potassium hydroxide and potassium pyrophosphates were first dissolved in water. The temperature was then brought up to 120° F. The carboxymethyl cellulose and persulphate were mixed as dry solids and the mixture was then slowly sifted into the solution while stirring. Care was used to avoid a high concentration of undissolved and unreacted carboxymethyl cellulose and thus avoid high temporary viscosities. As a result, over an hour was required to add all the mixed powder. After all the carboxymethyl cellulose and persulphate were added, stirring at 120° F. was continued for more than another hour to insure complete reaction of the oxidizing agent with the carboxymethyl cellulose. The solution was then cooled and poured into drums.

The resulting solution was a medium brown clear liquid having a density of 1.27 grams per milliliter at 80° F. The viscosity was 15 seconds in a Gardner Viscosimeter (about 1900 centipoises).

The pour point measured by ASTM Test D97–57 was 0° F. With regard to the pour point, it should be noted that alcohol should not be added in an effort to lower the pour point since the alcohol will cause a precipitate to form.

The scale inhibiting ability of the solution was tested. One test measured the ability to inhibit sulfate scale deposition while another test measured the carbonate scale inhibiting ability. In both tests a disc of perforated sheet metal about 2 inches in diameter was welded across the bottom of a metal tube about ⅜ inch in diameter and about 3 inches long. The tube was slip fitted over a vertical shaft rotated at about 30 r.p.m. The perforated disc was at the bottom of the assembly and the shaft was at the top of the tube. An electric heater was arranged to extend from the end of the shaft into the tube. The disc and tube assembly was first weighed and then immersed in a standard solution from which either sulfate or carbonate would deposit. The temperature of the tube was raised to about 165° F. in the sulfate test and about 185° F. in the carbonate test by means of the electric heater. The test period was 3 hours. At the end of this time the tube and disc assembly was removed from the shaft, rinsed with distilled water, dried and weighed. The results are presented in Table II. The standard sulfate test solution was prepared by mixing 17.2 grams CaCl$_2$·2H$_2$O, 16.7 grams Na$_2$SO$_4$ and 86.3 grams NaCl in sufficient water to make a liter of solution. The standard carbonate test solution was prepared by mixing 33.3 grams NaCl and 2.0 grams CaCO$_3$ in sufficient water to form a liter of solution. This solution was saturated with carbon dioxide while stirring. The amount of inhibiting concentrate indicated in Table II was dissolved in the test solution before the test.

TABLE II

| Test No. | Inhibitor | | | Scale | | | | Av. Percent Inhib. |
|---|---|---|---|---|---|---|---|---|
| | Type | Conc., p.p.m. | Age, months | Control | | Inhibited | | |
| | | | | Grams | Av. | Grams | Av. | |
| 1 | Sulfate | 20 | 0 | .3854 .5346 | .4600 | .0989 .0153 | .0571 | 87.6 |
| 2 | do | 20 | 4 | .8089 .8336 | .8212 | .1118 .1168 | .1143 | 86.1 |
| 3 | do | 40 | 4 | .7590 .6983 | .7286 | .0623 .0117 | .0370 | 94.9 |
| 4 | do | 10 | 4 | .8192 .8474 | .8333 | .3042 .3273 | .3156 | 62.2 |
| 5 | do | 10 | 2 | .8192 .8474 | .8333 | .5257 .4665 | .4961 | 40.6 |
| 6 | Carbonate | 10 | 0 | .1489 | | .0239 .0287 | | 84.0 |
| 7 | do | 10 | 2 | .1444 .1410 | .1427 | .0398 .0114 | .0342 | 76.0 |
| 8 | do | 10 | 2 | .1273 .1517 | .1395 | .0119 .0114 | .0116 | 91.7 |
| 9 | do | 10 | 4 | .1273 .1517 | .1395 | .0271 .0560 | .0416 | 70.2 |

The concentrations given in the table are parts per million by weight of the inhibitor concentrate which contained only about 11 percent by weight of carboxymethyl cellulose. Thus, in test 1, 20 p.p.m. of the concentrate provided only about 2.2 p.p.m. of carboxymethyl cellulose. The 40 p.p.m. of concentrate in test 3 provided only about 4.4 p.p.m. of carboxymethyl cellulose. A comparison of the results in these tests to those reported in Table II of my U.S. Patent 2,970,959 shows the very great improvement produced by oxidizing the carboxymethyl cellulose.

A comparison of tests 1 and 2 shows the stability of the liquid concentrate upon storage for 4 months as far as sulfate scale inhibition is concerned. Tests 4 and 5 show that even 10 p.p.m. of the inhibitor concentrate provides some sulfate scale inhibition although the degree of protection is rather low and the results are more erratic than usual.

Tests 6 to 9 inclusive show that only 10 p.p.m. of the liquid concentrate provided an acceptable level of carbonate scale inhibition even after storage for 4 months. Tests 7 and 8 are duplicate sets of tests and are included to show that experimental error can be rather high in this test at these very low inhibitor concentrations. This can also be seen by comparing the weight difference of duplicates in test 9. Thus, the average percent inhibition values in tests 6 to 9 should be interpreted as showing only general levels of effectiveness rather than specific levels which can be compared to each other with any great degree of reliability.

The composition given in Table I is a preferred one. The range of concentration of the carboxymethyl cellulose and phosphate may vary within rather broad limits, however. As noted above, the viscosity of a 5 percent solution of low viscosity carboxymethyl cellulose is only about 1000 centipoises so it is quite pourable. Even such low concentrations may be treated with an oxidizing agent under alkaline conditions, however, since, as noted above, the treatment enhances the scale inhibiting properties of the carboxymethyl cellulose. It is somewhat pointless to prepare concentrated solutions containing less than about 5 percent carboxymethyl cellulose, however, since higher concentrations can be easily used which avoid the difficulties of handling the much larger volumes of the more dilute solutions.

The combination of high pH and oxidation permits forming pourable solutions containing up to about 30 percent by weight of low viscosity carboxymethyl cellulose. In the presence of large amounts of phosphates, however, the amount of carboxymethyl cellulose in the overall composition should be limited to about 18 percent by weight. This is partly because of the viscosity increase due to the phosphate. It is also partly because if, for example, 20 percent of phosphate, 18 percent of carboxymethyl cellulose, and 5 percent potassium hydroxide are present, only 57 percent water can be present. Thus, the 18 parts carboxymethyl cellulose in 57 parts water amounts to a 24 percent by weight solution of the carboxymethyl cellulose in the reduced amount of water which is present.

The range of carboxymethyl cellulose concentration can obviously range from about 5 to about 30 percent by weight. Preferably it should be in the range from about 8 to about 18 percent by weight.

Concentration of the pyrophosphate can be as little as ⅓ that of carboxymethyl cellulose as suggested in my U.S. Patent 2,970,959. Thus, the pyrophosphate concentration may be as little as 1 percent by weight. It has been found that the effectiveness of the oxidized carboxymethyl cellulose is sufficiently great that the concentration of the phosphate can be as much as twice that of the oxidized cellulose derivative. Thus, theoretically the concentration of phosphate might be very high indeed. As pointed out above, however, when the concentration of phosphate becomes high, the concentration of carboxymethyl cellulose is restricted by the decreased percent of water which is present. Thus, the actual upper limit on phosphate concentration is imposed by an upper limitation on the total concentration of carboxymethyl cellulose and phosphate. In general, it can be said that the concentration of phosphate may be from about ⅓ to about 2 times the amount of carboxymethyl cellulose with the total concentration of phosphate and cellulose derivative not exceeding about 35 percent by weight of the solution. Preferably, the pyrophosphate concentration should be between about 10 and about 25 percent by weight of the total composition.

The concentration of potassium hydroxide should be between about 5 and about 10 percent based on the water. Best results are obtained when this concentration is about 7 or 8 percent. Since the water can vary between about 91 and 55 percent of the total composition, however, the concentration of potassium hydroxide in the total mixture can vary between about 3 and about 9 percent. Preferably, the potassium hydroxide concentration should be between about 4 and about 6 percent by weight of the total composition.

It should be noted that the concentration of potassium hydroxide should be in the range specified above during the oxidation reaction. After this reaction the solution can be partly or entirely neutralized without affecting the solubility or scale inhibiting properties of the oxidized carboxymethyl cellulose. Ordinarily, neutralizing the composition is pointless since the alkalinity of the unneutralized composition is not sufficient to be objectionable except for etching glass sample bottles and the like. It may be desirable in some cases, however, to take advantage of the alkaline nature of the composition to take into the solution acidic materials, such as ethylene diamine tetraacetic acid, which are sometimes included in scale inhibiting compositions. Another such acidic material is the acid phosphate ester of ethoxylated alkyl phenol which has both scale inhibiting and surface active properties useful in scale inhibiting compositions.

Still other acids such as pyrophosphoric acid, potassium acid pyrophosphate, hydrochloric acid, acetic acid, or the like, and other surface active agents such as petroleum sulfonic acids and fatty amide sulfonic acids can also be included if desired. In this connection, when the term "consisting essentially of" is used herein, it will be understood that it is intended to include not only the named ingredients, but also minor amounts of materials such as those named above, sodium chloride or the like which do not substantially adversely affect the properties of the composition.

A principal advantage of the liquid composition is that it can be easily continuously injected into the well, flow line, heater-treater, cooling system or the like which is to be protected. It will be obvious, however, that the solution can be intermittently injected if desired. For example, when treating a well, it may be desirable to pour a sufficient amount of the liquid composition into the well to fill a considerable section of the well below the producing zone. The concentrate, having a high density, will tend to remain in the bottom of the well except for a tendency to slowly dissolve or disperse into produced liquids. For such purposes the composition may contain close to the upper limit of carboxymethyl cellulose in order that the viscosity may be higher, thus decreasing the rate of dispersion of the concentrate into produced liquids. A gelling agent such as a high molecular weight polymer of ethylene oxide may even be added to cause the concentrate to gel after it is placed in the well. This even more greatly decreases the rate of dispersion of the concentrate into produced liquids.

Many alterations and variations to the above described examples are possible. For example, when preparing the liquid concentrate it is possible to add the phosphate after dispersing the carboxymethyl cellulose into the potassium hydroxide solution by the oxidizing step. This has the advantage of avoiding any possible decomposition of the pyrophosphate by the high temperature used in the oxidizing operation. As a practical matter, however, the pyrophosphates are sufficiently stable so that little reversion to the ortho form occurs during the short time of the oxidizing step, so it is preferred to add the pyrophosphate before the carboxymethyl cellulose. Similarly, the oxidizing agent may be dissolved in the water before the carboxymethyl cellulose is added. Somewhat better results are obtained, however, by mixing the dry oxidizing agent with the dry carboxymethyl cellulose before adding this mixture to the water. Still other variations will occur to those skilled in the art from the above description. I do not wish to be limited by the examples given above, but only by the following claims.

I claim:

1. A liquid scale-inhibiting composition consisting essentially of:

from about 55 to about 91 percent by weight of water,
from about 3 to about 9 percent by weight of potassium hydroxide,
from about 5 to about 30 percent by weight of carboxymethyl cellulose which has been treated with an oxidizing agent, in the presence of said potassium hydroxide, to a degree sufficient to decrease the viscosity of the solution and form a pourable solution, but treated to a degree insufficient to cause extensive charring of said carboxymethyl cellulose,
and a potassium pyrophosphate in an amount equal to from about 1/5 to about 2 times the concentration of said carboxymethyl cellulose,
the sum of concentrations of said carboxymethyl cellulose and said phosphate being no more than about 35 percent by weight.

2. The composition of claim 1 in which the concentrations are within the following preferred ranges by weight:
55 to 76 percent water
4 to 6 percent potassium hydroxide
8 to 18 percent treated carboxymethyl cellulose
10 to 25 percent potassium pyrophosphate.

3. A liquid scale-inhibiting composition consisting essentially of:
from about 55 to about 91 percent by weight of water,
from about 3 to about 9 percent by weight of potassium hydroxide,
from about 5 to about 30 percent by weight of carboxymethyl cellulose,
sufficient of an oxidizing agent to decrease the viscosity of the solution and form a pourable solution, but insufficient to cause extensive charring of said carboxymethyl cellulose,
and a potassium pyrophosphate in an amount equal to from about 1/5 to about 2 times the concentration of said carboxymethyl cellulose,
the sum of concentrations of said carboxymethyl cellulose and said phosphate being no more than about 35 percent by weight.

4. The composition of claim 3 in which the concentrations are within the following preferred ranges by weight:
55 to 76 percent water
4 to 6 percent potassium hydroxide
8 to 18 percent carboxymethyl cellulose
10 to 25 percent potassium pyrophosphate.

5. The composition of claim 3 in which said oxidizing agent is potassium persulfate.

6. The composition of claim 5 in which the concentrations are within the following preferred ranges by weight:
55 to 76 percent water
4 to 6 percent potassium hydroxide
8 to 18 percent carboxymethyl cellulose
10 to 25 percent potassium pyrophosphate
2 to 4 percent potassium persulfate,
all concentrations being in terms of percent by weight of the total composition except the potassium persulfate which is in terms of percent by weight of the carboxymethyl cellulose.

7. A method for preparing a liquid scale-inhibiting composition comprising adding a carboxymethyl cellulose to an aqueous solution consisting essentially of from about 5 to about 10 percent by weight of potassium hydroxide, while stirring at a temperature of from about 120° F. to about 150° F. and in the presence of an oxidizing agent in an amount sufficient to reduce the viscosity of the solution and form a pourable solution, but insufficient to cause extensive charring of said carboxymethyl cellulose, and also dissolving in the solution a potassium pyrophosphate in an amount equal to from about 1/5 to about 2 times the weight of said carboxymethyl cellulose, but insufficient to raise the total concentration of carboxymethyl cellulose and phosphate above about 35 percent by weight.

8. The method of claim 7 in which said phosphate is dissolved in said aqueous solution before said carboxymethyl cellulose is added, and said oxidizing agent and said carboxymethyl cellulose are mixed as dry solids before adding to said solution.

9. A method for preparing a liquid scale-inhibiting composition comprising dissolving from about 4 to about 6 parts of potassium hydroxide and from about 10 to about 25 parts of potassium pyrophosphate in from about 55 to about 76 parts of water, mixing together as dry solids from about 8 to about 18 parts of a carboxymethyl cellulose and potassium persulfate in an amount from about 2 to about 4 percent by weight of the carboxymethyl cellulose, the total amount of carboxymethyl cellulose and potassium pyrophosphate being not more than about 35 parts, all parts being by weight, and slowly adding the mixture of solids to the solution while stirring at a temperature of from about 120° F. to about 150° F.

References Cited

UNITED STATES PATENTS

| | | | |
|---|---|---|---|
| 2,121,952 | 6/1938 | Colonius et al. | 252—99 |
| 2,356,550 | 8/1944 | Volz | 252—99 |
| 2,970,959 | 2/1961 | Jones | 252—8.55 |
| 3,024,191 | 3/1962 | Jones | 252—8.55 |
| 3,188,289 | 6/1965 | Kahler et al. | 210—58 |

LEON D. ROSDOL, *Primary Examiner.*

W. E. SCHULZ, *Assistant Examiner.*